United States Patent
Staack

(10) Patent No.: US 7,983,657 B2
(45) Date of Patent: Jul. 19, 2011

(54) PRESENCE AND SESSION HANDLING INFORMATION

(75) Inventor: Jens Staack, Helsinki (FI)

(73) Assignee: Nokia Corporation, Espoo (FI)

( * ) Notice: Subject to any disclaimer, the term of this patent is extended or adjusted under 35 U.S.C. 154(b) by 759 days.

(21) Appl. No.: 10/451,730

(22) PCT Filed: Dec. 29, 2000

(86) PCT No.: PCT/EP00/13336
§ 371 (c)(1), (2), (4) Date: Jun. 25, 2003

(87) PCT Pub. No.: WO02/054745
PCT Pub. Date: Jul. 11, 2002

(65) Prior Publication Data
US 2004/0019912 A1  Jan. 29, 2004

(51) Int. Cl.
*H04M 3/42* (2006.01)

(52) U.S. Cl. ............... 455/414.1; 455/414.2; 455/456.2; 455/456.3; 709/206; 709/205; 709/204; 709/227; 709/224; 370/259; 370/271; 370/352

(58) Field of Classification Search ............... 455/433, 455/414.1, 414.2, 456.2, 456.3; 709/205, 709/204, 227, 224, 206; 370/259, 271, 352
See application file for complete search history.

(56) References Cited

U.S. PATENT DOCUMENTS

| 6,564,261 B1 * | 5/2003 | Gudjonsson et al. ......... 709/227 |
| 6,587,691 B1 * | 7/2003 | Granstam et al. .......... 455/456.1 |
| 6,654,606 B1 * | 11/2003 | Foti et al. ...................... 370/392 |
| 6,697,840 B1 * | 2/2004 | Godefroid et al. ............ 709/205 |
| 2001/0044299 A1 * | 11/2001 | Sandegren .................... 455/422 |
| 2004/0006623 A1 * | 1/2004 | Gourraud et al. ............. 709/227 |
| 2009/0009343 A1 * | 1/2009 | Boyer et al. ............... 340/573.1 |

FOREIGN PATENT DOCUMENTS

| WO | WO 99/34628 | 7/1999 |
| WO | WO 00/51391 | 8/2000 |

OTHER PUBLICATIONS

A. Eschenburg, "Wo Laufen Sie Denn? ICQ Haelt Vergindung Zu Bekannten", CT Magazine Fuer Computer Technik, No. 22, Oct. 26, 1998, pp. 92-95, XP000779803.
Day, et al.; "A Model for Presence and Instant Messaging", Network Working Group, Feb. 2000.

* cited by examiner

*Primary Examiner* — Ajit Patel
*Assistant Examiner* — Khai M Nguyen
(74) *Attorney, Agent, or Firm* — Ditthavong Mori & Steiner, P.C.

(57) ABSTRACT

The invention proposes a method for controlling a network comprising the steps of providing presence information to a user, wherein the presence information includes information regarding the presence of at least one other user in a network, and providing session handling information, wherein the session handling information includes information about how a session, which can be initiated to the other user, will be handled. The invention also proposes a corresponding network control device.

25 Claims, 2 Drawing Sheets

PRESENCE AND SESSION HANDLING INFORMATION

FIELD OF THE INVENTION

The present invention relates to a method for controlling a network and a network control device, by which a user is provided with information regarding presence etc. of other users in a network system.

BACKGROUND OF THE INVENTION

The present invention relates in general to initiating sessions. In the following, the term "session" is referred to a call, a multimedia video call, a whiteboard session, a chat, a messaging session, a game session or the like. In case of starting such a session, the user does not know before whether the intended session partner is available or not.

For example, in case a user A wants to initiate a video call to a user B. For this, the user A has to prepare the communication and has to start corresponding applications on his terminal (e.g., a personal computer or a mobile communication device like UMTS mobile phone). In this case, it is disadvantageous when user B is not available (i.e., is not online) and the troubles of user A were in vain.

Currently, in Instant Messaging and Present Protocol (IMPP) the user can get further information before starting a session. Instant Messaging allows a user to forward messages to terminals of other users immediately without the use of e-mails or the like. Therefor, also the intended recipient of such an instant message must be online. Thus, it is necessary for the sender (user A) to know whether the intended recipient is actually online. This information is provided by a so-called contact list (also referred to as "buddy list").

From this list, user A can get presence information, present status, location information etc. of the other users which are subscribed to such an Instant Messaging system.

The presence information indicates whether a particular user is online or offline. The present status indicates further whether the particular user is, for example, available, busy, available only for chat & games but not for calls and the like. The location information comprises information regarding the location like address, current position and the like (e.g. downtown Helsinki; Hauptstr. 12, 71069 Sindelfingen; longitude x, latitude y, altitude h etc.). Thus, by using this Instant Messaging and Present Protocol (IMPP), a user can get information regarding the presence of another user.

For Instant Messaging, many competing protocols are available, open and proprietary ones (e.g. AOL Instant Messaging), which are mainly designed for Personal Computer applications.

However, from the present protocols and resulting IMPP services, it is not possible for a user (i.e., the initiator of a session) to see how his session initiation will be handled.

That is, he may see from the contact list that someone is online, but it is not possible to see whether the recipient is actually prepared to accept a session like a call or the like.

SUMMARY OF THE INVENTION

Therefore, the object underlying the invention resides in removing the above drawbacks of the prior art and to improve the information provided for a user before or during initiating a session.

This object is solved by a method for controlling a network comprising the steps of providing presence information to a user, wherein the presence information includes information regarding the presence of at least one other user in a network, and providing session handling information, wherein the session handling information includes information about how a session, which can be initiated to the other user, will be handled.

Alternatively, the above object is solved by a network control device, wherein the network control device is adapted to provide to a first user presence information and session handling information regarding at least one other user, wherein the presence information includes information regarding the presence of the other user in a network, and the session handling information includes information about how a session, which can be initiated to the other user, will be handled.

Hence, a user can obtain by using the above method or the network control device information regarding presence of another user and, in addition, information as to how a session will be handled, if the user starts a session to the other user.

Thus, before a user starts a session based on the information (i.e., from an enhanced contact list, which includes the presence and session handling information), he can already see how and where his session is handled. This is more convenient than the current "try a session and see where it ends", wherein, e.g., a user calls someone and then has to notice that he is connected to the voicemail box or that the session is forwarded to someone else.

The presence information and session handling information may be provided before a session to the other user is initiated. Thus, a user knows in advance how a session to another user will be handled, before he actually starts the session.

The session handling information comprises information regarding forwarding of a session. Thus, a user can know before starting a session whether his session will be forwarded to someone else or a session recording system.

The session may be a call and the session handling information comprises information regarding forwarding of a call. Hence, a user can know before initiating the call whether his call will be forwarded to another person or to a voice mailbox system.

The information may be obtained by an information obtaining device. The information may be obtained by accessing a database comprising presence and session handling information.

Such a database may be arranged in a dedicated network control device. By this measure, all important data are hold in the network control device itself.

The database may be an external database. By this measure, it is possible to ensure that only up-to-date information of a specific user are used. The external database may be a Home Subscriber Server (HSS) or a Home Location Register (HLR), for example.

The presence information may further comprise location information of a user and/or may further comprise information regarding which type of communication is possible with a user.

The presence and session handling information may be provided individually for each user. That is, different users may obtain different information regarding the same user. By this measure, some privacy can be ensured such that not all information are presented to all users of a server.

The invention also proposes a network system comprising a network control device as described above and at least one communication device adapted to receive the presence and session handling information.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiments of the invention are described in more detail with reference to the accompanying drawings.

Figure 1:
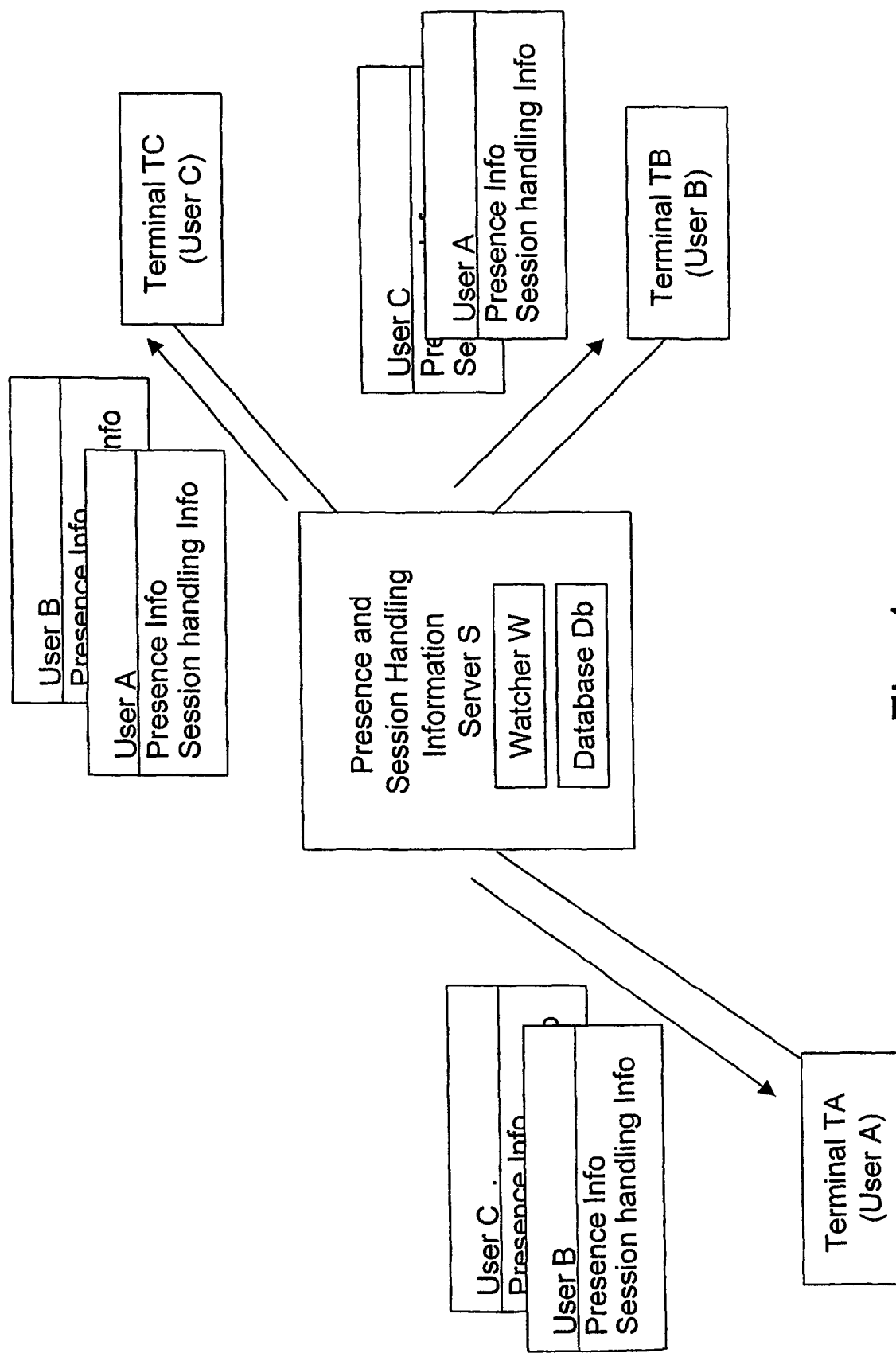
FIG. 1 shows a presence information server and user terminals connected to the server according to a first embodiment.

FIG. 1 shows a network system comprising a Presence and Session Handling Information Server S and a plurality of terminals TA to TC of users A to C connected to the server. The connections between each terminal and the server, and also the terminals itself may be configured arbitrarily. That is, a terminal may be a computer which is connected to the server via the Internet or a mobile phone which is connected via a mobile telephone network to the server. The necessary gateways and the like for connecting different types of terminals to the server are omitted here for simplifying the description.

The Presence and Session Handling Information Server S provides an enhanced contact list (which is also referred to as a "buddy" list). In this list, each user connected to the server is included and information regarding his presence etc. are included. That is, the contact list indicates for each user presence information (online/offline), present status (available, busy, available-for specific communications like chat or online games only, etc.), location information and the like.

In addition, the contact list indicates for each user how a session initiated to this user will be handled. This information is referred to as session handling information.

For example, an important manner how a session is handled is forwarding of sessions. That is, if user A wants to call user B, it is possible that user A has forwarded sessions (e.g., telephone calls) to, e.g., his secretary. In case user A wants to talk to user B privately, then starting a call, i.e., a session, would be useless.

Thus, due to the session handling information (in the above case: forwarding information) a user can know before starting a session whether his session will be forwarded to someone else or a session recording the system. For example, the forwarding information can indicate that voice sessions are forwarded to the voice mailbox system, whereas fax will be forwarded to a fax-to-email gateway and email will be forwarded to a secretary, etc.

Thus, according to the present invention the enhanced contact list also includes session handling information. In the following, an example for such an enhanced contact list is given:

| | |
|---|---|
| User B: | Presence Information |
| | online, |
| | available for chat, |
| | not available for calls |
| | Session Handling Information |
| | forwarding: |
| | calls to secretary: +497894123456, |
| | fax to +497894123489, |
| | emails to postmaster@homedomain.com |
| User C: | Presence Information |
| | online, |
| | available for games, |
| | accepts only calls based on his business |
| | contact namelist at URL: |
| | user_A_buisness_contacts.homedomain.com |
| | (does not accept other calls) |
| | Session Handling Information |
| | forwarding: |
| | calls to Ms. X (wife): +358-50-987654 |
| | fax to Gatewayfax |
| | user.C@fax.homedomain. com |
| | emails forwarded to wastebasket. |

As illustrated in FIG. 1, user A receives the information regarding users B and C which are also connected to the server S. Thus, user A can already see from his contact list (i.e., when looking at the session handling information) if it is worth to start the session. If in the above example user A wants to speak to user C in person, he might not start a session because he sees that his session will be forwarded to user C's wife.

Thus, before a user starts a session based on the information in his contact list (buddy list), he can already see how and where his session is handled.

According to the present (first) embodiment, the necessary information is hold in the Presence and Session Handling Information Server S. That is, the server S comprises a database Db in which information necessary for providing the presence and session handling information (i.e., for providing the contact list) are included. The server transmits the information to each user connected to the server S and updates the information. For example, an update can be performed periodically at regular intervals (e.g. every minute) or not periodically on each occasion a user contacts the server.

It is noted that the contact list can be the same for every user (i.e., the user also receives information regarding himself), but can also be generated individually for each user. This case is illustrated in FIG. 1 according to which the users do not receive information about themselves.

In addition, the information may be provided differently for each user. For example, it is assumed that user C is prepared to accept sessions only from user A but not from user B. Thus, the corresponding presence information for user A indicates "available for calls", but the corresponding presence information for user B indicates "not available for calls".

Similarly, only sessions from a particular user (e.g., A) may be forwarded to a secretary of user C, whereas sessions from other users (e.g. B) are not forwarded at all or are forwarded directly to the voice mail of user C. By this measure, some privacy can be achieved. That is, for example the telephone number of the person to whom sessions are forwarded is not presented to everyone who is connected to the Presence and Session Handling Information Server S.

The information for the user profile database is obtained, for example, by using a watcher W. A watcher is a client by which information regarding the presence and the session handling with respect to a user is detected. The watcher (information obtaining means) operates basically in two manners. On the one hand, the watcher requests from the user to input specific information, for example during log-in. On the other hand, the watcher notifies changes during a session. For example, in case after e.g. 20 minutes no input was received from user A, it is assumed that this user is currently not using his terminal TA and accordingly his availability of the presence information is switched to "not available."

Thus, the database of the Presence and Session Handling Information Server S is always updated by means of the watcher W, and the updated data are forwarded to the users connected to the server S.

According to the first embodiment, all necessary information are hold in the database of the Presence and Session Handling Information Server S.

However, some of the information necessary for presence and session handling information may be already stored in other existing databases. For example, in UMTS (Universal Mobile Telephone System) the Home Subscriber Server (HSS) comprises data related to subscriber information of a user, location information of a user and a user profile.

Thus, according to a second embodiment, the Presence and Session Handling Information Server comprises links to other databases which supplement the present information of a user. These links may be interfaces to the HSS as mentioned above, and/or other user profile databases, location databases etc.

Figure 2:
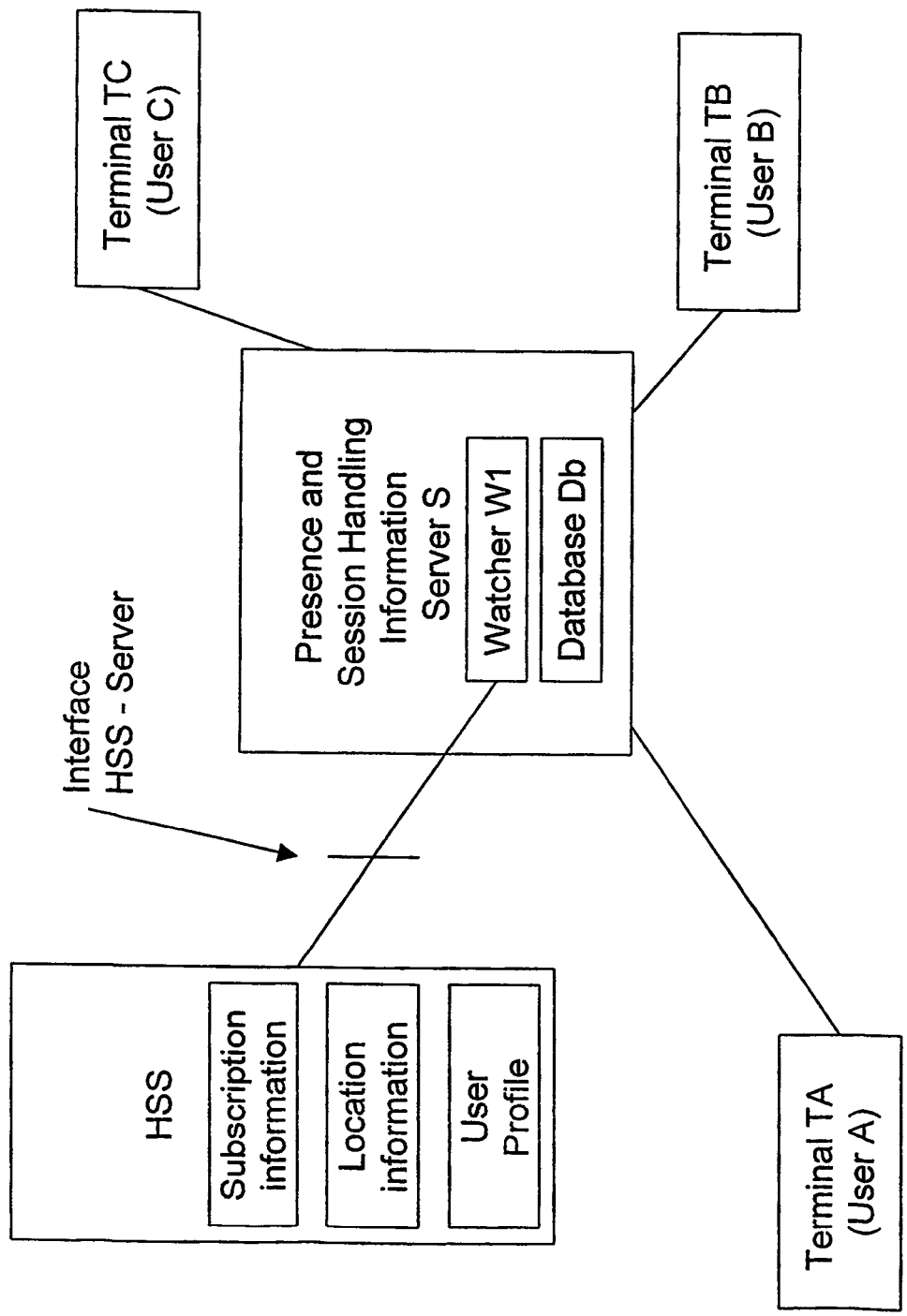
FIG. 2 shows a presence information server and user terminals connected to the server according to a second embodiment.

In FIG. 2, an example for such a link to another database, here the HSS, is illustrated. The same reference characters denote the same or similar elements as those shown in FIG. 1.

As indicated in FIG. 2, the HSS provides subscription information, location information and user profiles. The watcher W1 of the server S is able to establish a link to the HSS and fetch the information required for the Presence and Session Handling Information Server.

Thus, a new interface between the server S and the external database has to be defined, as illustrated in FIG. 2.

It is noted that there may be several links to a plurality of different databases, depending on the different types of network systems the users belong to. For example, also Home Location Register (HLR) or a main subscriber database of an Internet Provider may be contacted.

Furthermore, it is noted that the watcher mentioned in the above embodiments is only an example, and any detecting device suitable to obtain the necessary information can be used.

Moreover, the contact list described above may contain even more items than mentioned in the above embodiments. That is, also other information items regarding a user may be included, which may be related to a session initiation or not, or which provide additional information about a user.

The above description and accompanying drawings only illustrate the present invention by way of example. Thus, the embodiment may vary within the scope of the attached claims.

In particular, the embodiments can also be combined. That is, all data may be hold in the database Db of the server S (as in the first embodiment), but in addition links to other databases like HSS are provided (as in the second embodiment) by means of which the database Db of the server S is updated.

The invention claimed is:

1. A method, comprising:
providing presence information to a plurality of users, wherein the presence information includes information regarding the presence of at least one other user in a network, the at least one other user not included among the plurality of users; and
providing session handling information to the plurality of users, wherein the session handling information includes information about how a session, which can be initiated to the at least one other user, will be handled,
wherein during the presence information providing, the presence information is provided individually to each of the plurality of users, and
wherein during the session handling information providing, the session handling information is provided individually to each of the plurality of users so that session handling information for handling a session with the at least one other user is provided differently among the plurality of users, wherein providing the session handling information differently comprises at least one of the plurality of users receiving different session handling information than the session handling information provided to at least one of the other plurality of users.

2. The method according to claim 1, wherein the providing is performed before a session to the other user is initiated.

3. The method according to claim 1, wherein the session handling information comprises information regarding forwarding of a session.

4. The method according to claim 1, wherein the session is a call and the session handling information comprises information regarding forwarding of a call.

5. The method according to claim 1, wherein the information providing comprise accessing a database comprising presence and session handling information.

6. The method according to claim 5, wherein the database is configured in a dedicated server.

7. The method according to claim 5, wherein the database is an external database.

8. The method according to claim 7, wherein the external database is a home subscriber server.

9. The method according to claim 7, wherein the external database is a home location register.

10. The method according to claim 1, wherein the presence information further comprises location information of a user.

11. The method according to claim 1, wherein the presence information further comprises information regarding which type of communication is possible with a user.

12. An apparatus, comprising:
a transmitter configured to provide presence information and session handling information to a plurality of users, wherein the presence information includes information regarding the presence of at least one other user in a network, and the session handling information includes information about how a session, which can be initiated to the at least one other user, will be handled, the at least one other user not included among the plurality of users,
a presence information provider configured to provide the presence information individually to each of the plurality of users; and
a session information provider configured to provide the session handling information individually to each of the plurality of users, so that session handling information for handling a session with the at least one other user is provided differently among the plurality of users, wherein providing the session handling information differently comprises at least one of the plurality of users receiving different session handling information than the session handling information provided to at least one of the other plurality of users.

13. The apparatus according to claim 12, wherein the apparatus is configured to provide the presence information and session handling information before a session to the other user is initiated.

14. The apparatus according to claim 12, wherein the session handling information comprises information regarding forwarding of a session.

15. The apparatus according to claim 12, wherein the session is a call and the session handling information comprises information regarding forwarding of a call.

16. The apparatus according to claim 12, further comprising:
an information obtainer configured to obtain presence information and session handling information.

17. The apparatus according to claim 16, wherein the information obtainer is configured to access a database comprising presence information and session handling information.

18. The apparatus according to claim 17, wherein the database is configured in the apparatus.

19. The apparatus according to claim 17, wherein the database is an external database.

20. The apparatus according to claim 19, wherein the database is a home subscriber server.

21. The apparatus according to claim 19, wherein the database is a home location register.

22. The apparatus according to claim 12, wherein the presence information further comprises location information of a user.

23. The apparatus according to claim 12, wherein the presence information further comprises information regarding which type of communication is possible with a user.

24. An apparatus, comprising:
presence information providing means for providing presence information to a plurality of users, wherein the presence information includes information regarding the presence of at least one other user in a network, the at least one other user not included among the plurality of users;
session handling information providing means for providing session handling information to the plurality of users, wherein the session handling information includes information about how a session, which can be initiated to the at least one other user, will be handled;
user presence providing means for providing the presence information individually to each of the plurality of users; and
user session providing means for providing the session handling information individually to each of the plurality of users so that session handling information for handling a session with the at least one other user is provided differently among the plurality of users, wherein providing the session handling information differently comprises at least one of the plurality of users receiving different session handling information than the session handling information provided to at least one of the other plurality of users.

25. A computer program product embodied on a computer readable medium, the computer program configured to control a processor to perform:
providing presence information to a plurality of users, wherein the presence information includes information regarding the presence of at least one other user in a network, the at least one other user not included among the plurality of users; and
providing session handling information to the plurality of users, wherein the session handling information includes information about how a session, which can be initiated to the at least one other user, will be handled,
wherein during the presence information providing, the presence information is provided individually to each user of the plurality of users, and
wherein during the session handling information providing, the session handling information is provided individually to each of the plurality of users so that session handling information for handling a session with the at least one other user is provided differently among the plurality of users, wherein providing the session handling information differently comprises at least one of the plurality of users receiving different session handling information than the session handling information provided to at least one of the other plurality of users.

* * * * *